United States Patent
Wurlitzer

(10) Patent No.: US 6,360,474 B1
(45) Date of Patent: Mar. 26, 2002

(54) WIND-POWERED APPARATUS INCLUDING ANIMATED FIGURE

(76) Inventor: Douglas P. Wurlitzer, P.O. Box 1556, Chico, CA (US) 95927

( * ) Notice: Subject to any disclaimer, the term of this patent is extended or adjusted under 35 U.S.C. 154(b) by 0 days.

(21) Appl. No.: 09/526,611

(22) Filed: Mar. 16, 2000

(51) Int. Cl.[7] .............................................. A01M 31/06
(52) U.S. Cl. ................................ 43/3; 40/417; 446/199
(58) Field of Search ........................... 43/2, 3; 446/199, 446/210, 217, 236; 40/417

(56) References Cited

U.S. PATENT DOCUMENTS

| 1,110,245 | A | | 9/1914 | Vaughan | |
|---|---|---|---|---|---|
| 1,442,290 | A | * | 1/1923 | Pallone | ......................... 40/417 |
| 1,538,562 | A | * | 5/1925 | Koshalko | ..................... 446/199 |
| 1,940,490 | A | * | 12/1933 | Frazier | ......................... 40/417 |
| 1,953,272 | A | * | 4/1934 | Smith | ........................... 40/417 |
| 2,638,705 | A | * | 5/1953 | Petrasy | ....................... 446/199 |
| 3,220,253 | A | * | 11/1965 | Parker | .......................... 73/189 |
| 4,620,385 | A | | 11/1986 | Carranza et al. | |
| 5,085,075 | A | * | 2/1992 | Baker | ...................... 73/170.05 |
| 5,144,764 | A | | 9/1992 | Peterson | |
| 5,191,730 | A | | 3/1993 | Balmer | |
| D394,463 | S | | 5/1998 | Filho | |
| 5,862,619 | A | | 1/1999 | Stancil | |
| 6,170,188 | B1 | * | 1/2001 | Mathews | .......................... 43/3 |

* cited by examiner

*Primary Examiner*—Kurt Rowan
(74) *Attorney, Agent, or Firm*—Thomas R. Lampe

(57) ABSTRACT

Wind-powered apparatus includes an animated figure depicting an animal. The body, wing and tail portions of the animal figure can be readily replaced to provide different apparatus configurations and appearances.

16 Claims, 5 Drawing Sheets

WIND-POWERED APPARATUS INCLUDING ANIMATED FIGURE

TECHNICAL FIELD

This invention relates to wind-powered apparatus including an animated figure depicting an animal. The invention is applicable, for example, for use as a decoy for waterfowl, an ornamental device for use in a lawn or garden or a weather vane.

BACKGROUND OF THE INVENTION

It is well known to provide animated duck and goose decoys actuated by the wind.

For example, U.S. Pat. No. 5,144,764, issued Sep. 8, 1992, U.S. Pat. No. 4,620,385, issued Nov. 4, 1986, U.S. Pat. No. 5,862,619, issued Jan. 26, 1999, and U.S. Pat. No. 5,191,730, issued Mar. 9, 1993, disclose decoys having structure that is wind actuated. U.S. Design Pat. No. DES.394,463, issued May 19, 1998, discloses an ornamental design for a wind operated toy. U.S. Pat. No. 1,110,245, issued Sep. 8, 1914 discloses a decoy which incorporates a clockwork mechanism which provides a degree of decoy movement. This latter patent is representative of many prior art mechanisms which provide for movement of a decoy or parts of a decoy by other than wind power.

DISCLOSURE OF INVENTION

The present invention discloses a wind-powered apparatus including an animated figure depicting an animal. The apparatus may, for example, be utilized as a waterfowl decoy in which the wings of the animated figure move in response to wind. The invention can also suitably be employed for other purposes, such as as a weather vane or as a lawn or garden ornament which is wind powered. The invention encompasses a basic framework which allows components of the animated figure to be removed and replaced by components of other shapes, if desired. Furthermore, this feature facilitates storage and transport of the apparatus.

The mechanism employed in the apparatus to provide for wing movement is efficient, enabling the apparatus to operate in an animated fashion in less than heavy wind conditions. Utilizing the principles of the invention, a variety of wing motions can be attained.

The wind-powered apparatus of the present invention includes an animated figure depicting an animal. The apparatus includes a framework having a support.

An animal figure body is connected to the framework above the support.

The apparatus also includes a pair of animal figure wings. Wing releasable connector means releasably connects the animal figure wings to the framework, each animal figure wing being pivotally movable relative to the animal figure body and the support and each of the animal figure wings being releasably connected to said framework at a location spaced from where the animal figure body is connected to the framework.

A wind-powered propeller is mounted on the framework and rotatable relative to the framework and includes a rotatable propeller drive shaft.

Actuator means operatively interconnects the rotatable propeller drive shaft and the animal figure wings to pivot the animal figure wings responsive to rotation of the rotatable propeller drive shaft.

The apparatus additionally comprises animal figure body releasable connector means releasably connecting the animal figure body to the framework. The animal figure wings and the animal figure body are independently releasably connected to the framework for independent connection thereto or removal therefrom.

Other features, advantages, and objects of the present invention will become apparent with reference to the following description and accompanying drawings.

MODES FOR CARRYING OUT THE INVENTION

Figure 1:
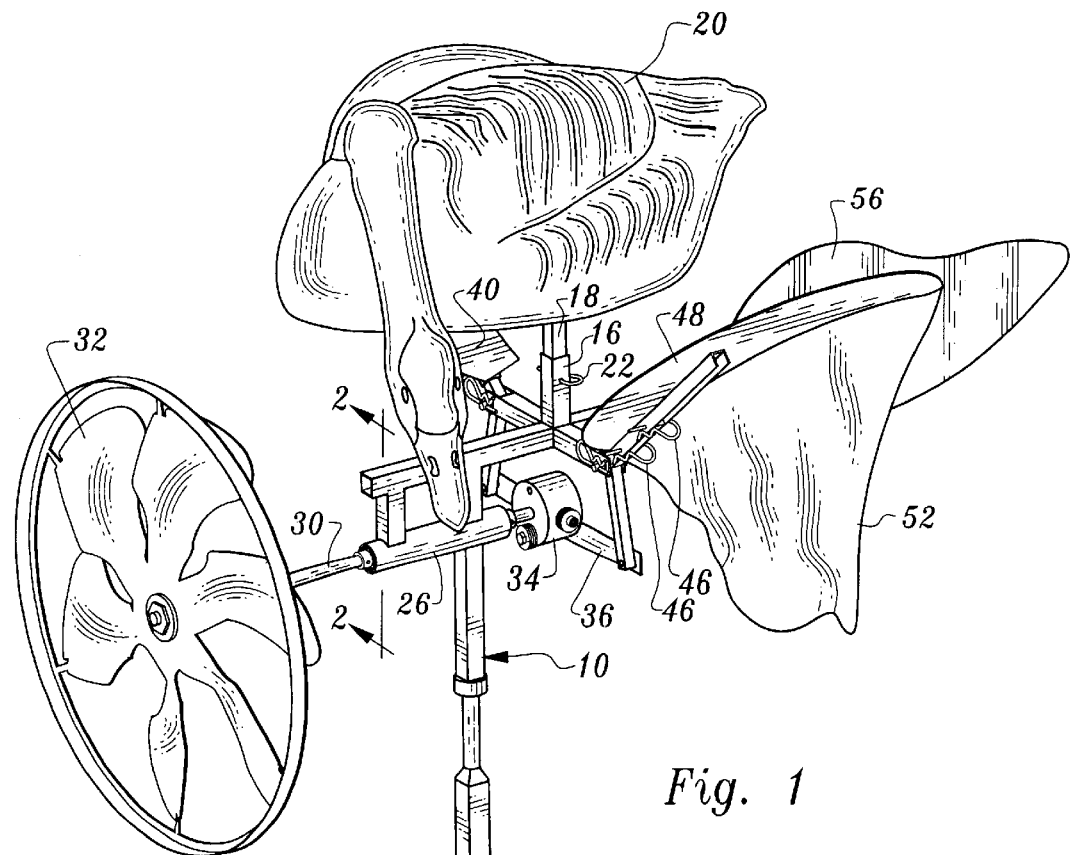
FIG. 1 is a perspective view illustrating a preferred embodiment of apparatus constructed in accordance with the teachings of the present invention.
Figure 2:
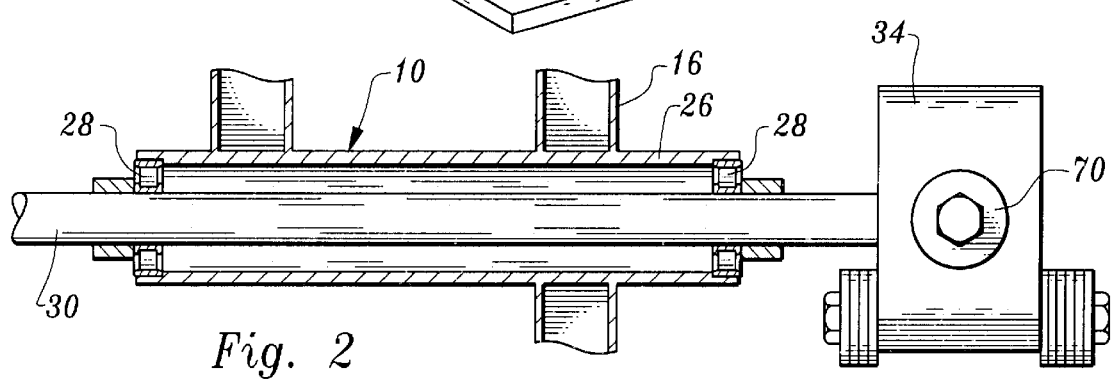
FIG. 2 is an enlarged, partial sectional view taken along the line 2—2 in FIG. 1.
Figure 3:
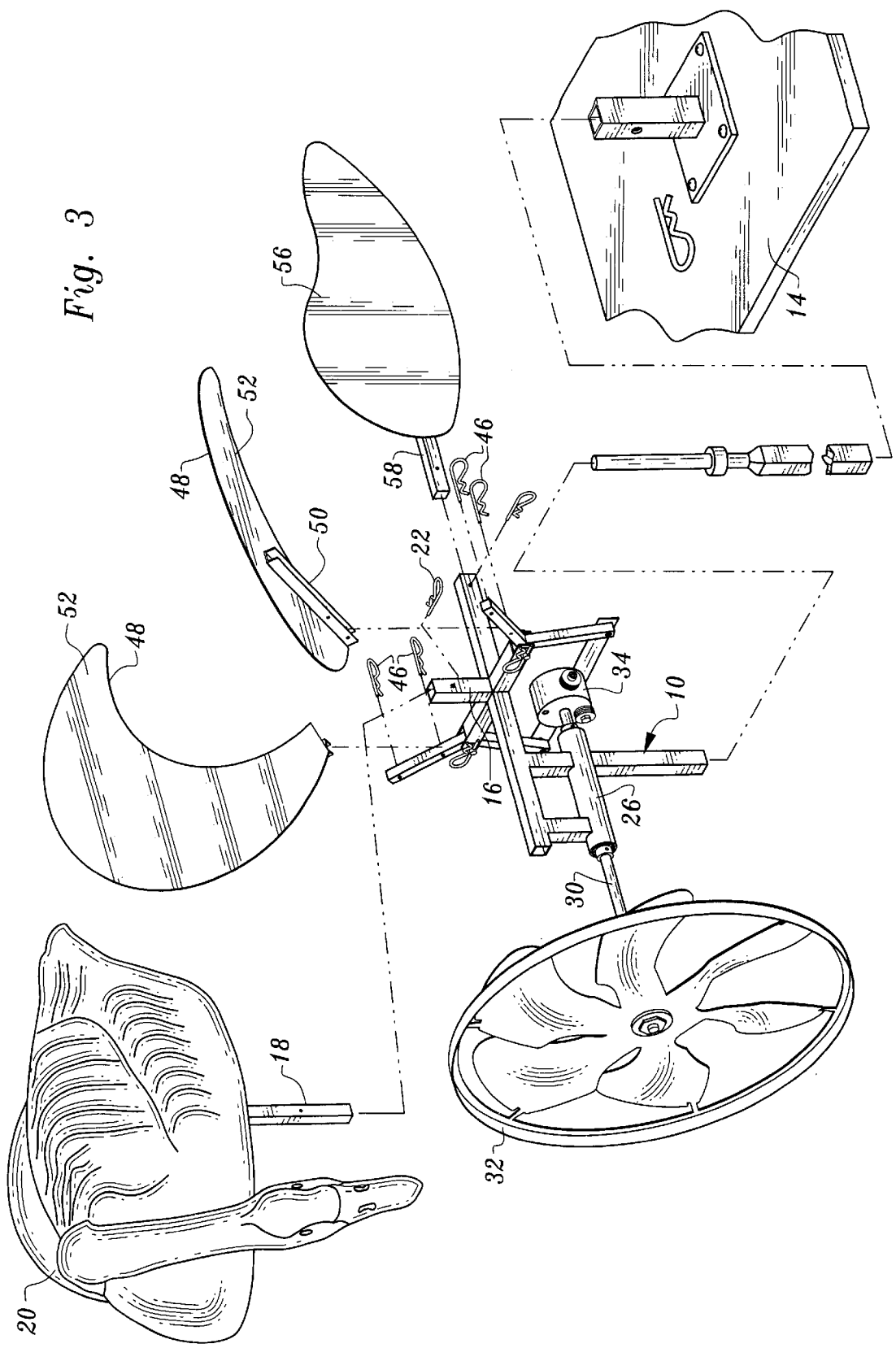
FIG. 3 is an exploded, perspective view of the embodiment of FIG. 1.
Figure 4:
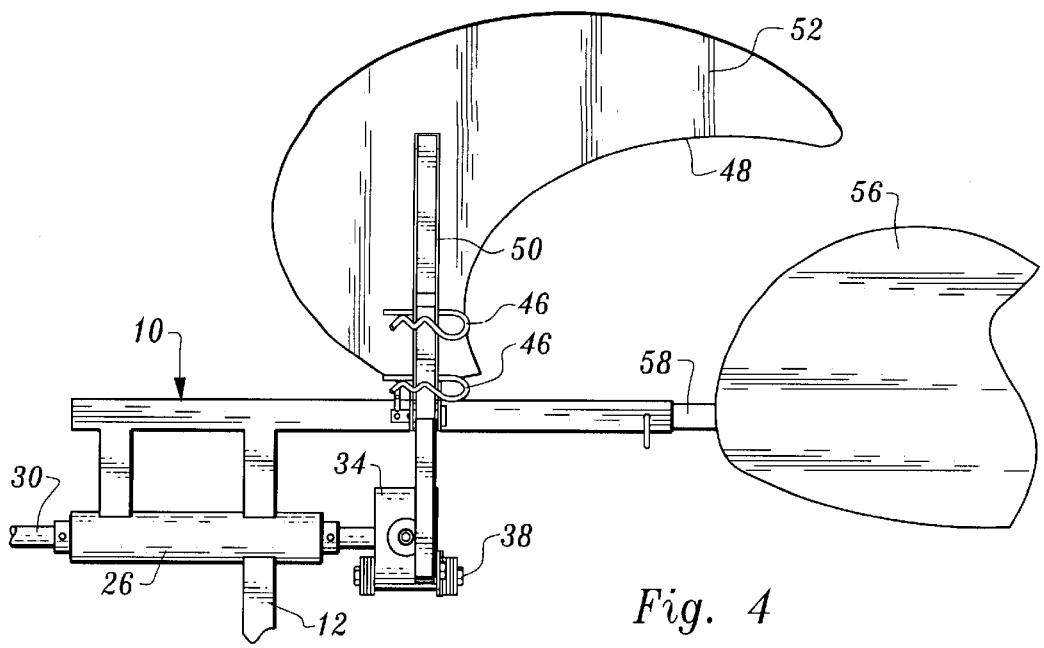
FIG. 4 is a partial, elevational side view illustrating a portion of the apparatus framework and related structural components including an animal figure wing and an animal figure tail.
Figure 5:
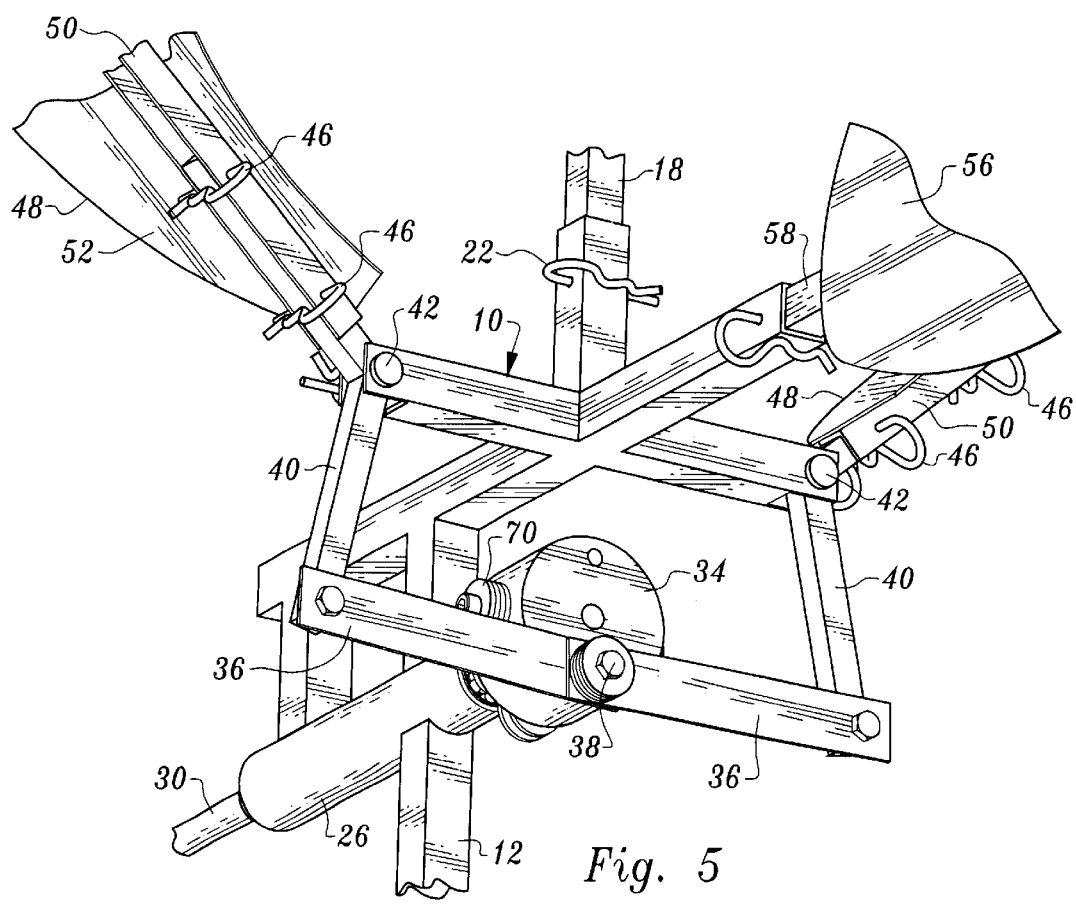
FIG. 5 is an enlarged, perspective view illustrating an actuator member in association with the framework of the apparatus employed to pivot the animal figure wings.

Referring now to FIGS. 1–6C a preferred embodiment of the invention is illustrated. The apparatus includes a framework 10 including a support 12. In the arrangement illustrated, the support 12 extends upwardly from a base 14. It will be appreciated, however, that the support stand need not be associated with a base, any suitable means being employed to maintain the support stand in an upright condition. For example, the support stand 12 could terminate at a point and driven into the ground. The support can be adjustable, if desired. The support allows rotational movement of the rest of the framework about a vertical axis.

At the top thereof the framework 10 includes an upstanding receptacle element 16 which releasably receives therein a projection 18 extending from the bottom of an animal figure body 20, which in this instance is in the form of a goose's body. The receptacle element 16 and the projection 18 cooperate with a cotter pin 22 to releasably retain the animal figure body 20 in place on the framework.

Framework 10 also includes a cylindrically shaped housing 26 having bushings 28 at the ends thereof. A rotatable propeller drive shaft 30 passes through the housing and bushings and/or bearings. At one end thereof propeller drive shaft 30 is affixed to a propeller 32.

Figure 6A:
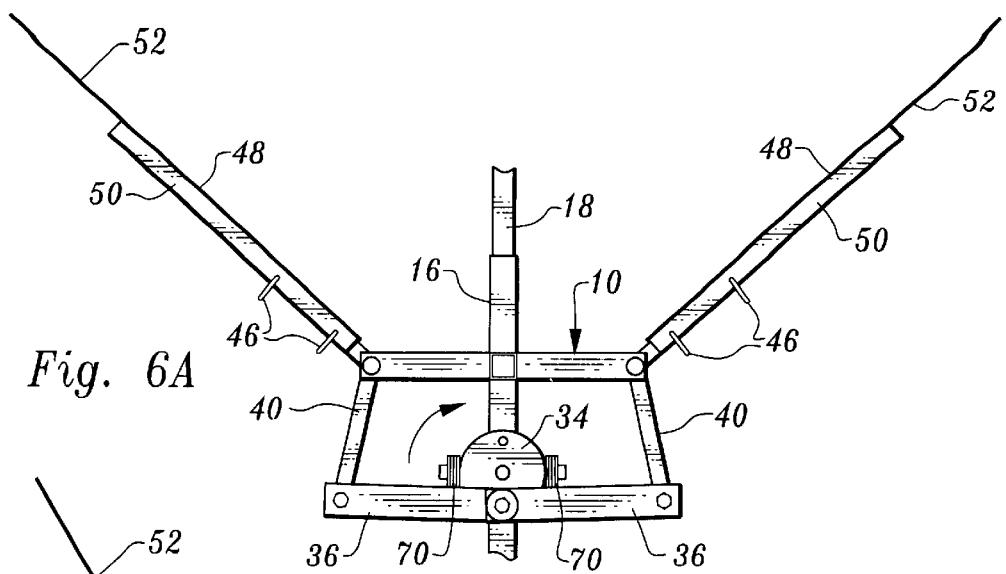
FIGS. 6A through 6C are schematic presentations illustrating the actuator member, a portion of the framework and animal figure wings at different stages of the operation of the embodiment FIG. 1.
Figure 6B:
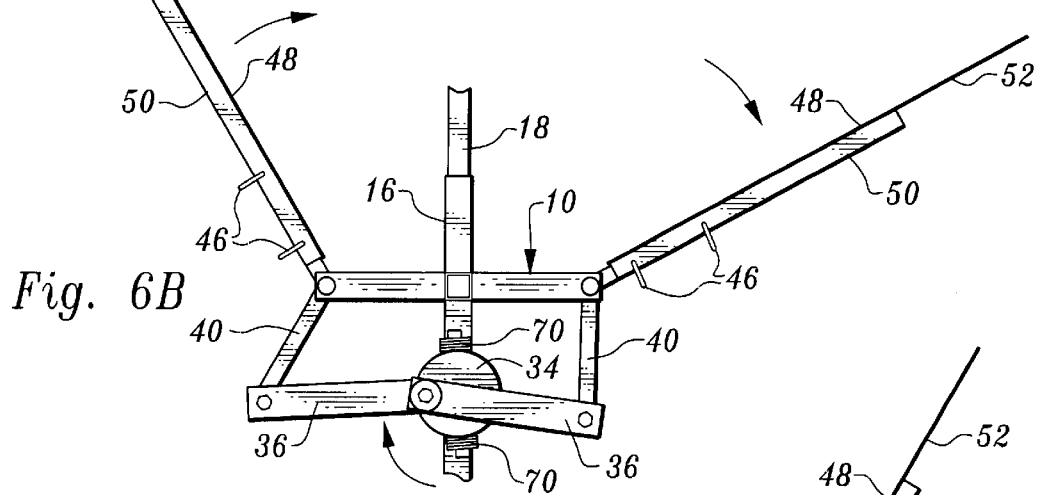
Figure 6C:
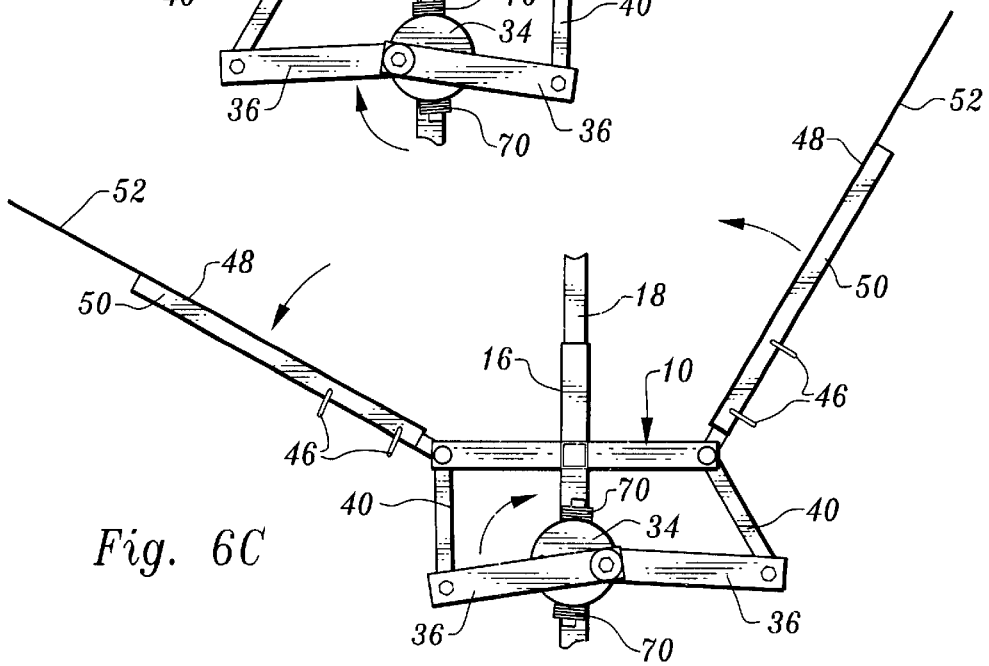

Attached to the other end of propeller drive shaft 30 is an actuator member 34 having a pair of links 36 pivotally connected thereto on a pivot pin 38 eccentrically mounted on the actuator member at a location spaced from the axis of rotation thereof. The distal ends of the links 36 are pivotally connected to ends of crank arms 40 of the framework 10. These crank arms are pivotally connected by pins 42 to the rest of the framework 10. The rest of framework 10 remains in fixed position relative to the support 12, while the crank arms pivotally reciprocate due to rotation of actuator member 34 and the action of links 36, power of course being provided by wind driven propeller 32. FIGS. 6A–6C show the relative positions assumed by the actuator member, the links and the crank arms during various stages of operation.

Cotter pins 46 are utilized to attach a pair of animal figure wings 48 to the upper ends of the crank arms. Each of the wings includes a rigid wing member in the form of a channel 50 and a flexible wing member 52 formed of fabric or the like secured to the channel 50. The cotter pins 46 pass through the channels 50 and crank arms to releasably connect the wings to the framework 10. The flexible wing member 52 will flutter in a breeze or wind.

Also releasably secured to framework 10 by a cotter pin is an animal figure tail 56, a projection 58 attached to the tail being received in an open end of the framework. The tail keeps the apparatus pointed into the wind.

Figure 9:
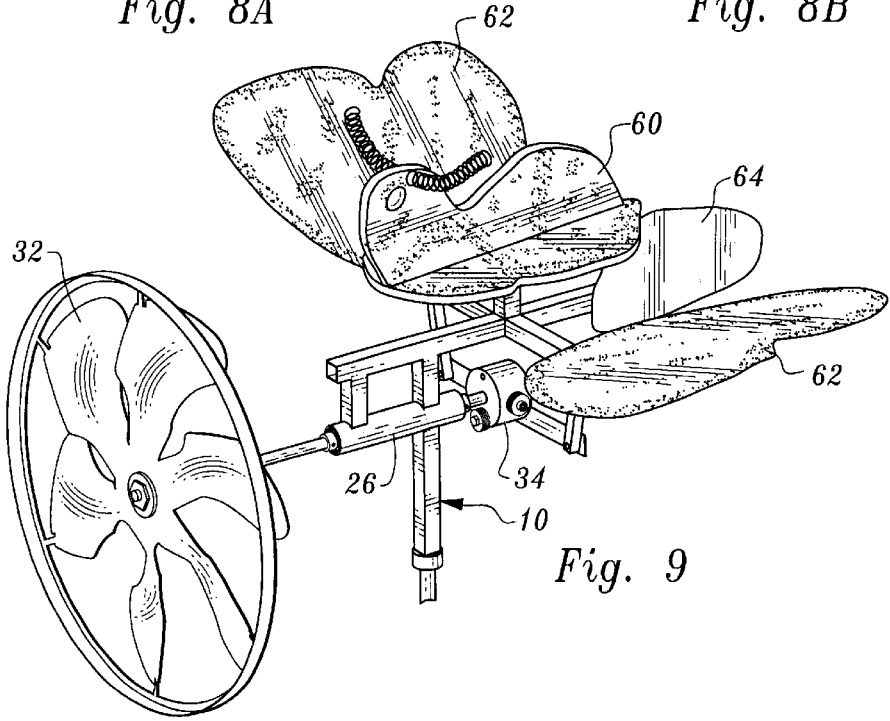
FIG. 9 is yet another embodiment of the invention which is similar in construction to that of FIG. 1 but disclosing an animated animal figure in the form of an insect.

It will be seen that with the arrangement just described the animal figure body, wings and tail elements of the apparatus may be readily removed from the framework. This allows the same framework to be used with different types and configurations of animal figure bodies, wings and/or tails. FIG. 9, for example, shows an arrangement wherein an insect body 60, insect wings 62 and an insect tail 64 are in place. One, for example, may wish to use the framework alternatively as a decoy, a lawn or garden decoration, or as a weather vane, and the overall appearance of the apparatus can be readily changed depending upon which body, wing and tail components are utilized. The releasable connections also allow the body, wing and tail components to be readily removed for shipment or storage.

FIGS. 6A–6C show a link, crank arm, actuator member combination which will result in pivotal movement of both wings 48 in the same direction at the same time.

It will be appreciated that different forces will have to be applied to the crank arms and wings at different stages of this operation. According to the present invention, counterweights 70 are attached to the actuator member at locations spaced from both the axis of rotation of the actuator member and the location of pivotal attachment of the links to the actuator member to compensate for the different forces which have to be applied to the apparatus by the propeller action to operate the apparatus. That is, when the wing action is such as to require application of higher force a counterweight will be appropriately placed to compensate for this. In the arrangement illustrated, each counterweight includes a plurality of counterweight elements (which perhaps may best be seen in FIG. 5) attached to a counterweight element holder in the form of a pin or post projecting from the periphery of the actuator member. The washer or disc-like counterweight elements may be removed or added to smooth out operation of the apparatus.

Figures 7A, 7B, 7C:
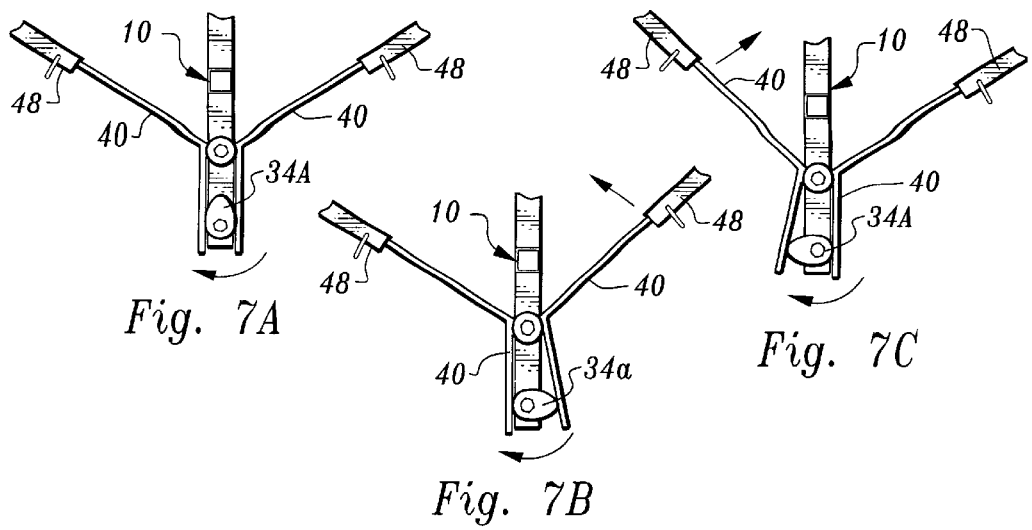
FIGS. 7A–7C illustrate another embodiment of the invention including a different type of actuator member employed to pivot animal figure wings, the actuator member comprising a single lobe cam and the structural elements being shown at different stages of the operation of the apparatus.

FIGS. 7A–7C depict an arrangement wherein the actuator member 34A comprises a single lobed cam member affixed to the rotatable propeller shaft. Rotation of actuator member 34A will cause the lobe to alternately engage the lower ends of the crank arms 40, causing the wings to have the movement shown by the arrows in FIGS. 8B and 8C.

Figures 8A, 8B:
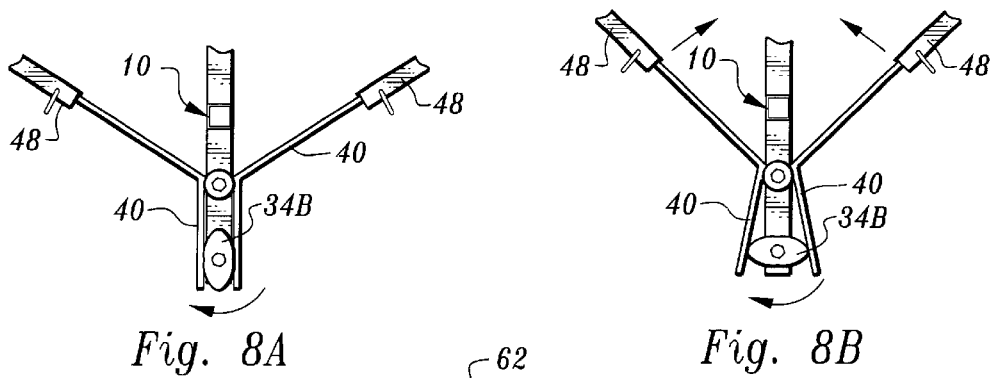
FIGS. 8A and 8B illustrate a different embodiment of the invention wherein a double lobed actuator member is employed to impart wing action different from that shown in FIGS. 8A–8C.

FIGS. 8A and FIG. 8B illustrate another arrangement wherein the actuator member 34B has two lobes, resulting in the wing and crank arm action shown in FIG. 9B.

Various changes can be made without departing from the spirit or scope of the invention. For example, the apparatus could incorporate an electric motor providing power for the animated figure. The propeller could be associated with a generator and rechargeable battery associated with the motor. In addition, the battery and/or generator could be used to power electrical lights.

What is claimed is:

1. Wind-powered apparatus including an animated figure depicting an animal, said apparatus comprising, in combination:

a framework including a support;

an animal figure body connected to said framework above said support;

a pair of animal figure wings;

wing releasable connector means releasably connecting said animal figure wings to said framework, each said animal figure wing being pivotally movable relative to said animal figure body and said support and each said animal figure wing being releasably connected to said framework at a location spaced from where said animal figure body is connected to said framework;

a wind-powered propeller mounted on said framework and rotatable relative to said framework and including a rotatable propeller drive shaft; and actuator means operatively interconnecting said rotatable propeller drive shaft and said animal figure wings to pivot said animal figure wings responsive to rotation of said rotatable propeller drive shaft, said actuator means comprising an actuator member spaced from said propeller attached to said rotatable propeller drive shaft, and said framework including a first framework portion and a plurality of second framework portions pivotally mounted on said first framework portion, said actuator means additionally comprising a pair of links extending between said actuator member and said second framework portions, rotation of said actuator member moving said links, and said animal figure wings being releasably connected to said second framework portions and movable with said second framework portions when said links are moved by said actuator member.

2. The wind-powered apparatus according to claim 1 additionally comprising animal figure body releasable connector means releasably connecting said animal figure body to said framework, said animal figure wings and said animal figure body being independently releasably connected to said framework for independent connection thereto or removal therefrom.

3. The wind-powered apparatus according to claim 1 wherein said actuator member has an axis of rotation, each of said links being eccentrically pivotally attached to said actuator member at a location spaced from the axis of rotation of said actuator member.

4. The wind-powered apparatus according to claim 3 additionally comprising at least one counterweight attached to said actuator member at a location spaced from both the axis of rotation of said actuator member and where said links are pivotally attached to said actuator member.

5. The wind-powered apparatus according to claim 1 wherein said second framework portions comprise crank arms.

6. The wind-powered apparatus according to claim 1 additionally comprising an animal figure tail and tail releasable connector means releasably connecting said animal figure tail to said framework.

7. The wind-powered apparatus according to claim 1 wherein said framework includes two crank arms pivotally connected to the remainder of said framework, said animal figure wings being releasably connected to said crank arms by said wing releasable connector means, said actuator member comprising a cam member affixed to said rotatable propeller shaft and operatively associated with said crank arms to reciprocally pivot said crank arms and said animal figure wings responsive to rotation of said propeller and said propeller drive shaft.

8. The wind-powered apparatus according to claim 1 wherein each of said animal figure wings includes a rigid wing member engageable by said wing releasable connector means to releasably connect said animal figure wings to said framework and a flexible wing member attached to said rigid wing member.

9. The wind-powered apparatus according to claim 4 wherein said at least one counterweight includes a plurality of counterweight elements and a counterweight element holder attached to said actuator member for holding a preselected quantity of said counterweight elements.

10. The wind-powered apparatus according to claim 1 comprising a decoy, said animal figure body having the appearance of a waterfowl body and said animal figure wings having the appearance of waterfowl wings.

11. The wind-powered apparatus according to claim 1 wherein said animal figure body has the appearance of an insect body and wherein said animal figure wings have the appearance of insect wings.

12. The wind-powered apparatus according to claim 6 comprising a weather vane, said animal figure tail cooperating with wind to move said framework and animal figure body.

13. The wind-powered apparatus according to claim 8 wherein said rigid wing members comprise channels engageable with said framework and wherein said wing releasable connector means comprises mechanical fasteners.

14. The wind-powered apparatus according to claim 1 comprising a decorative lawn ornament.

15. The wind-powered apparatus according to claim 13 wherein said mechanical fasteners comprise cotter pins.

16. Wind-powered apparatus including an animated figure depicting an animal, said apparatus comprising, in combination:

a framework including a support;

an animal figure body connected to said framework above said support;

a pair of animal figure wings;

wing releasable connector means releasably connecting said animal figure wings to said framework, each said animal figure wing being pivotally movable relative to said animal figure body and said support and each said animal figure wing being releasably connected to said framework at a location spaced from where said animal figure body is connected to said framework;

a wind-powered propeller mounted on said framework and rotatable relative to said framework and including a rotatable propeller drive shaft; and actuator means operatively interconnecting said rotatable propeller drive shaft and said animal figure wings to pivot said animal figure wings responsive to rotation of said rotatable propeller drive shaft, each of said animal figure wings including a rigid wing member engageable by said wing releasable connector means to releasably connect said animal figure wings to said framework and a flexible wing member attached to said rigid wing member, said rigid wing members comprising channels engageable with said framework and said wing releasable connector means comprising mechanical fasteners in the form of cotter pins.

* * * * *